United States Patent [19]

Carter

[11] Patent Number: 4,732,452
[45] Date of Patent: Mar. 22, 1988

[54] OPTICAL CONNECTORS

[75] Inventor: Andrew C. Carter, Blisworth, United Kingdom

[73] Assignee: Plessey Overseas Limited, Ilford, England

[21] Appl. No.: 606,501

[22] Filed: May 3, 1984

[30] Foreign Application Priority Data

May 7, 1983 [GB] United Kingdom ............... 8312650

[51] Int. Cl.$^4$ ............................................. G02B 6/38
[52] U.S. Cl. ............................. 350/96.21; 350/96.18
[58] Field of Search ............... 350/96.18, 96.20, 96.15, 350/96.21

[56] References Cited

U.S. PATENT DOCUMENTS

| 3,950,075 | 4/1976 | Cook et al. | 350/96.18 |
| 4,101,196 | 7/1978 | Imai | 350/96.18 |
| 4,265,511 | 5/1981 | Nicia et al. | 350/96.18 |
| 4,289,374 | 9/1981 | Franken et al. | 350/96.20 |
| 4,290,667 | 9/1981 | Chown | 350/96.18 |
| 4,294,511 | 10/1981 | Yamashita et al. | 350/96.18 |
| 4,389,085 | 6/1983 | Mori | 350/96.18 |
| 4,538,278 | 8/1985 | Gergely | 350/96.18 |
| 4,545,643 | 10/1985 | Young et al. | 350/96.20 |
| 4,563,057 | 1/1986 | Ludman et al. | 350/96.18 |
| 4,569,569 | 2/1986 | Stewart | 350/96.18 |

FOREIGN PATENT DOCUMENTS

| 0014960 | 9/1980 | European Pat. Off. . |
| 0032722 | 7/1981 | European Pat. Off. . |
| 0053914 | 6/1982 | European Pat. Off. . |
| 0066218 | 12/1982 | European Pat. Off. . |
| 0070980 | 2/1983 | European Pat. Off. . |
| 1232671 | 5/1971 | United Kingdom . |
| 1429843 | 3/1976 | United Kingdom . |
| 1537477 | 12/1978 | United Kingdom . |
| 2013922 | 8/1979 | United Kingdom . |
| 1569615 | 6/1980 | United Kingdom . |
| 1587226 | 4/1981 | United Kingdom . |
| 2062893 | 5/1981 | United Kingdom . |
| 2091899 | 8/1982 | United Kingdom . |
| 2120400 | 11/1983 | United Kingdom . |

Primary Examiner—William L. Sikes
Assistant Examiner—Frank González
Attorney, Agent, or Firm—Fleit, Jacobson, Cohn & Price

[57] ABSTRACT

A connector for monomode optical fibres comprises two connectable housings in each of which is secured the end of an optical fibre which is substantially coaxially aligned with at least two light displacement means which produce a light beam with a predetermined form from light transmitted along the optical fibre. The light beams from the two housings are complementary so that a light beam from either housing is focussed onto the end of the optical fibre in the other housing when the two housings are connected. The light displacement means may be convex or concave lenses, SELFOC (Registered Trade Mark) lenses, prisms or combinations of these. The light beam from each housing is preferably parallel but one can be divergent and the other convergent. They may also both be divergent with an additional lens between the housings.

7 Claims, 4 Drawing Figures

OPTICAL CONNECTORS

BACKGROUND OF THE INVENTION

This invention relates to optical connectors and more particularly to connectors for the ends of two optical fibres which will accurately optically align the ends of the fibres.

The invention is particularly suitable for connecting monomode optical fibres since such fibres can have a high degree of eccentricity. Conventional mechanical alignment techniques, such as precision ferrules and V-grooves are normally only suitable for highly concentric fibres, and alignment of monomode fibres by making them concentric using techniques such as centre-less grinding are cumbersome and expensive. These techniques are also unlikely to result in connectors which can be assembled in the field, which is highly desirable.

SUMMARY OF THE INVENTION

It is an object of the present invention therefore to provide an optical connector in which such problems of connecting monomode fibres will be overcome or considerably reduced.

According to the present invention an optical connector for optically aligning the ends of two optical fibres comprises a connection member including means for supporting the end of an optical fibre and having at least two light displacement means, the light displacement means being positioned in the connection member such that when light passes along the optical fibre into the connection member a light beam having a predetermined form emanates from the connection member, the connection member being adapted to be joined to a similar complementary connection member whereby a light beam from either connection member is focussed on to the end of the optical fibre in the other connection member.

In this specification the term "light displacement means" includes any optical device for deflecting and/or focussing a beam of light, such as convex and concave lenses, SELFOC (Registered Trade Mark) lenses and prisms. The term "light" includes light normally invisible to the human eye, such as infra-red and ultraviolet light.

BRIEF DESCRIPTION OF THE DRAWINGS

Embodiments of the invention will now be described by way of example only with reference to the accompanying drawings in which.

DESCRIPTION OF THE PREFERRED EMBODIMENTS

In the embodiments the optical lever principle is used to adjust the light beam in each half of the connector. The connector is particularly suitable for monomode optical fibres but can also be used for multimode fibres.

Figure 1:
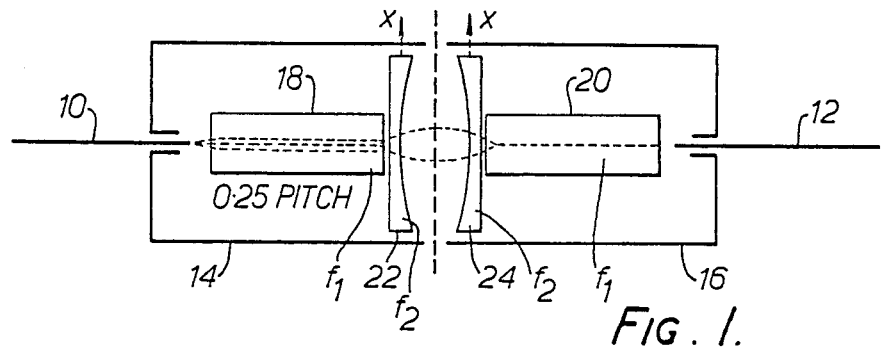
FIG. 1 is a schematic arrangement of an optical connector according to the invention.

In FIG. 1 two fibres 10, 12 are held substantially in alignment by two connector half shells 14, 16. A minimum of two lenses is required in each half shell and the drawing shows a SELFOC (Registered Trade Mark) rod lens 18, 20 of 0.25 pitch and a diverging plano-concave lens 22, 24 in each half shell. A light beam from each fibre is set to be nominally parallel and axial when it leaves each connector half shell by radial adjustment of the concave lens 22, 24 and axial adjustment of the selfoc lens 18, 20 to vary the spacing between the end of the fibre 10, 12 and the SELFOC (Registered Trade Mark) lens 18, 20. A movement of the concave lens 22, 24 by a distance x is equivalent to a movement of $x(f_1/f_2)$ at the fibre, where $f_1$ is the focal length of the selfoc lens and $f_2$ is the focal length of the concave lens. Consequently a strong "optical lever" can be built into the connector giving very simple alignment. The focussing and alignment of each connector half can be achieved by either monitoring the far field with a TV or a detector array, or by optimising the coupled power into another connector half. The non planar interface as the beam emerges into the air ensures minimal power reflection down the fibre, which can cause noise in monomode and multimode systems.

The connector can be modified to give a non-parallel light beam when it leaves each connector half for increased eye safety. This can be achieved by having a controlled diverging beam from either connector half and positioning a simple fixed lens between the two connector halves to convert the diverging beam into a converging beam before it enters the other connector half. Alternatively, one connector half can be focussed to give a divergent beam and the other half focussed to compensate. (In this case the second half would launch a convergent beam if operated as a transmitter.)

Figure 2:
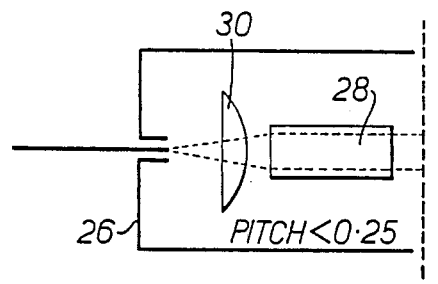
FIG. 2 is a schematic arrangement of one half only of an alternative optical connector.
Figure 3:
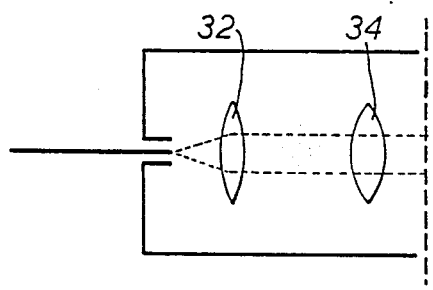
FIG. 3 is a schematic arrangement of one half only of a further alternative optical connector and, FIG. 4 is a cross-sectional view of one half only of a practical embodiment of the invention.

In FIG. 2 there is shown a connector half 26 having a SELFOC (Registered Trade Mark) lens 28 and a plano-convex lens 30. The beam from this half is adjusted in the same manner as the FIG. 1 embodiment, the lens 30 being moved radially in this case. In FIG. 3 two convex lenses 32, 34 are used and either of the lenses can be moved axially or radially to obtain the required form and position of the beam.

The arrangement can also be used for mono and multimode wavelength division multiplex and splitter components where a wavelength selective or semi-silvered element is placed between the two halves of the connector. It also enables the fabrications of optoelectronic modules, such as lasers, pinfets, etc., with optical connectors instead of permanently bonded optical fibres or "pigtails".

Figure 4:
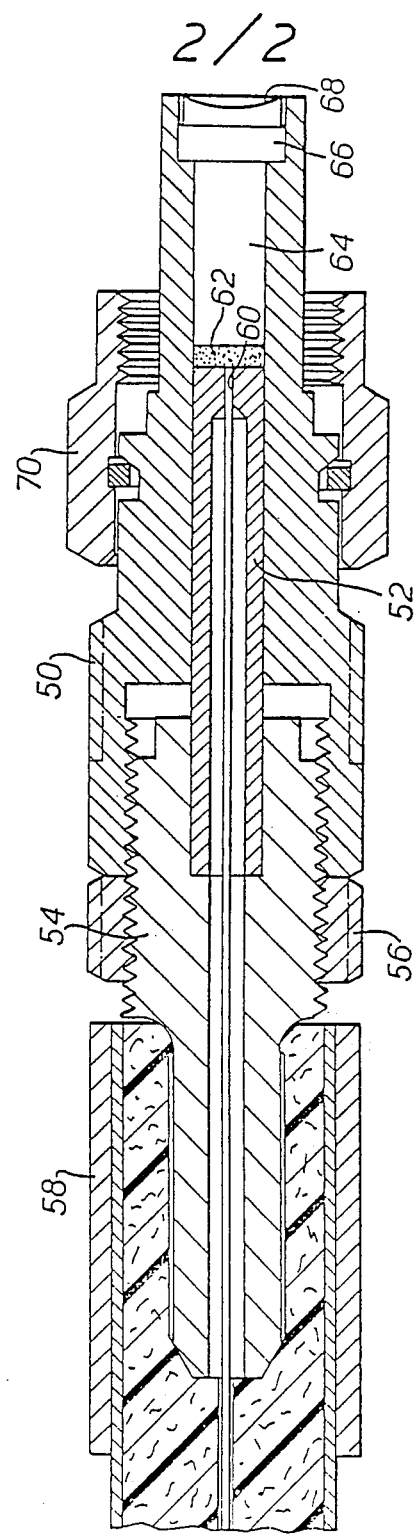

FIG. 4 illustrates one half of a practical optical connector according to the invention. This consists of a housing 50 in which is located a ferrule 52. The ferrule is held in position by a fiber supporting member 54 which is screw fitted into the housing 50 and locked by a lock-nut 56. A sheath surroundng the optical fibre is secured to the end of the fibre supporting member 54 by a crimping sleeve 58. The optical fibre and its cladding is secured in the fibre supporting member 54 and the ferrule 52 by a suitable bonding medium, such as epoxy resin, and the end of the optical fibre has its cladding removed and extends through the small diameter hole 60 at the end of the ferrule 52. The end of the optical fibre is flush with the end of the ferrule and suitably polished and abuts an index matching pad 62 of, for example, clear silicone rubber. The pad 62 abuts a SELFOC (Registered Trade Mark) lens 64, which in turn abuts and is bonded to a glass plate 66 which is bonded into the end of the housing 50. A plano convex lens 68 is aligned on the glass plate 66 to give the required beam and is bonded thereto, the outer walls of the lens 68 being coated with an anti-reflection coating. In this case the pad 62, the lens 64 and the plate 66 are assembled to produce a parallel output beam. The lens 68 is bonded into position after radial adjustment so that the output beam is focussed exactly on the axis of the optical connector. The other half of the connector is similarly focussed so that when the two halves are assembled together light from either fibre is focussed on to the end of the optical fibre in the other half of the connector.

The completed connector half can then be coupled to a similar connector half and the two halves secured together with a captive connecting nut 70 rotatably mounted on the housing 50.

I claim:

1. An optical connector arranged to be coupled with a complementary connector to form an optical connection between optical fibres, said connector including:

support means for supporting an end of a first of said optical fibres;

an optical axis, said support mean supporting said end of said first optical fibre nominally on said optical axis;

a first light displacement means mounted on said optical axis, said first light displacement means having a first light displacement power;

a second light displacement means mounted on said optical axis, said second light displacement means having a second light displacement power;

mounting means for said second light displacement means, said mounting means permitting adjustment of said second light displacement means orthogonally of said optical axis;

and joining means permitting the optical connector to be coupled to said complementary connector to form an optical connection between an optical fibre supported thereby and said first of said optical fibres.

2. An optical connector according to claim 1 wherein said first and second light displacement means are arranged so that light emanating from said first of said optical fibres exits said connector substantially parallel to said optical axis.

3. An optical connector according to claim 1 wherein said first and second light displacement means are arranged so that light emanating from said first of said optical fibres exits said connector divergingly of said optical axis.

4. An optical connector according to claim 2 wherein said first and second light displacement means comprise convex lenses.

5. An optical connector according to claim 2 wherein said first light displacement means comprises a rod lens and said second light displacement means comprises a plano-convex lens, said second light displacement means being located adjacent said end of said first of said optical fibres.

6. An optical connector according to claim 3 wherein said first light displacement means comprises a rod lens and said second light displacement means comprises a plano-concave lens, said first light displacement means being located adjacent said end of said first of siad optical fibres.

7. An optical connector according to claim 2 wherein one of said first and said second light displacement means is adjustable along said optical axis.

* * * * *